United States Patent [19]
Minoura

[11] Patent Number: 5,191,463
[45] Date of Patent: * Mar. 2, 1993

[54] SCANNING OPTICAL SYSTEM IN WHICH A GHOST IMAGE IS ELMINATED

[75] Inventor: Kazuo Minoura, Yokohama, Japan

[73] Assignee: Canon Kabushiki Kaisha, Tokyo, Japan

[*] Notice: The portion of the term of this patent subsequent to Feb. 19, 2008 has been disclaimed.

[21] Appl. No.: 588,934

[22] Filed: Sep. 27, 1990

Related U.S. Application Data

[63] Continuation of Ser. No. 823,981, Jan. 30, 1986, Pat. No. 4,993,792, which is a continuation of Ser. No. 724,044, Apr. 18, 1985, abandoned, which is a continuation of Ser. No. 434,331, Oct. 14, 1982, abandoned.

[30] Foreign Application Priority Data

Oct. 20, 1981 [JP] Japan ................................. 56-167385

[51] Int. Cl.$^5$ ............................................ G02B 26/08
[52] U.S. Cl. ................................... 359/218; 359/216; 346/108; 355/49
[58] Field of Search ................ 359/196, 216, 218, 217, 359/219; 346/108; 355/49, 66; 358/75, 80, 88, 89, 481

[56] References Cited

U.S. PATENT DOCUMENTS

| | | | |
|---|---|---|---|
| 3,211,046 | 10/1965 | Kennedy | 359/220 |
| 3,835,249 | 9/1974 | Dattilo et al. | 359/217 |
| 3,848,087 | 11/1974 | Carrell | 359/218 |
| 4,040,737 | 8/1977 | Masaki et al. | 355/49 |
| 4,379,612 | 4/1983 | Matsuoka et al. | 359/218 |
| 4,993,792 | 2/1991 | Minoura | 359/218 |

FOREIGN PATENT DOCUMENTS

| | | |
|---|---|---|
| 0018787 | 4/1983 | European Pat. Off. . |
| 2363455 | 7/1974 | Fed. Rep. of Germany . |
| 51-150346 | 12/1976 | Japan . |
| 1431059 | 4/1976 | United Kingdom . |

*Primary Examiner*—Loha Ben
*Attorney, Agent, or Firm*—Fitzpatrick, Cella, Harper & Scinto

[57] ABSTRACT

A scanning optical system is provided with a deflector for deflecting a light beam, a medium to be scanned by the light beam deflected by the deflector, and an imaging optical system disposed between the medium to be scanned and the deflector. A linear image near the deflecting - reflecting surface of the deflector and a point on the surface of the medium to be scanned are in a conjugate relation through the imaging optical system. The imaging optical system is such that the angle which the optical axis of the imaging optical system forms with respect to the optical axis of the light beam incident on the deflector in a plane parallel to the deflecting plane of the light beam is chosen so that a ghost image is formed in the direction of the scanning line of the medium to be scanned and outside the effective scanning area.

6 Claims, 3 Drawing Sheets

SCANNING OPTICAL SYSTEM IN WHICH A GHOST IMAGE IS ELMINATED

This application is a continuation of application Ser. No. 823,981 filed Jan. 30, 1986, now U.S. Pat. No. 4,993,792 issued Feb. 19, 1991, which was a continuation of application Ser. No. 724,044 filed Apr. 18, 1985, now abandoned, which was a continuation of application Ser. No. 434,331 filed Oct. 14, 1982, now abandoned.

BACKGROUND OF THE INVENTION

1. Field of the Invention

This invention relates to a scanning optical system in which a ghost image is eliminated.

2. Description of the Prior Art

In recent years, a technique of scanning the surface or a photosensitive medium with a modulated light beam to effect recording has often been used. It is known that when a surface to be scanned is scanned by a deflector using a plurality of reflecting surfaces such as a polygon mirror, the scattered light beam created on the surface to be scanned can become a ghost image and imparts an undesirable influence to the image. Means for eliminating such ghost image are disclosed in U.S. Pat. No. 4,040,737. The technique thereof is shown in FIG. 1 of the accompanying drawings. If a scanning optical system is used, in which a parallel light beam Lc impinges on the reflecting surface 3a of a deflector 3 and the deflected light beam Ld is imaged on a medium 6 to be scanned by a rotation-symmetric optical system 7 to cause the light beam Lc to further impinge at an angle relative to a plane perpendicular to the rotational axis 8 of the deflector 3, elimination of the ghost becomes possible. That is, by a slit 9 being disposed between the optical system 7 and the medium 6 to be scanned and adjacent to the medium 6 to be scanned, the ghost image Pg formed in the direction orthogonal to a scanning line 10 can be intercepted.

In the field of such a scanning optical system, there is known a system which prevents the position of the scanning line on the surface to be scanned from being varied by the falling of the deflecting-reflecting surface of the deflector or the falling of the rotational axis of the deflector. FIG. 2 of the accompanying drawings shows an example of the construction of such scanning optical system. A light beam L emitted from a light source device 1 comprising a light source, a condenser, etc. passes through a linear image forming system 2 such as a cylindrical lens and impinges on a reflecting surface 3a of a deflector 3 comprising a rotatable polygon mirror while being linearly converged. The light beam L is reflected by the reflecting surface 3a, passes through an imaging optical system comprising a spherical single lens 4 and a single lens 5 having a toric surface having a major axis and a minor axis having different refractive powers in two orthogonal directions and impinges on a medium 6 to be scanned, thus forming an imaged spot thereon. This imaged spot scans the medium 6 to be scanned at a predetermined speed with the rotation of the deflector 3.

FIG. 3 of the accompanying drawings shows the optical path in a cross section parallel to the deflecting surface of the above-described construction, in other words, a plane containing the major axis of the single lens 5 and the optical axis of the spherical single lens 4. FIG. 4 of the accompanying drawings shows the optical path in a direction perpendicular to the deflecting plane of deflection of the light beam L as deflected by the deflector 3, and illustrates the influence of the falling of the reflecting surface 3a of the deflector 3. The light beam L emitted from the light source device 1 is linearly imaged near the reflecting surface 3a of the deflector 3 by the linear image forming system 2. The refractive power of the single lens 5 in the cross section of FIG. 4 differs from the refractive power of the single lens 5 in the deflecting plane of FIG. 3, and in the imaging optical system comprising the spherical single lens 4 and the single lens 5, the positional relation between the reflecting surface 3a of the deflector 3 and the medium 6 to be scanned is an optically conjugate relation. Accordingly, even if the reflecting surface 3a is inclined from a direction perpendicular to the deflecting plane during rotation of the deflector 3 and changes to a position 3A, the light beam L passing through the imaging optical system comprising the single lenses 4 and 5 changes as indicated by dotted lines but yet no change of the imaged position thereof on the medium 6 to be scanned occurs.

Again in such a scanning optical system, as shown in FIG. 5 of the accompanying drawings, the light beam L having impinged on a point Ps on the medium 6 to be scanned is diffusion-reflected on the surface of the medium 6 to be scanned, and the reflected light La thereof passes through the single lenses 5 and 4 and again impinges on the deflector 3, as indicated by dotted lines. At this time, the reflected light La from the medium 6 to be scanned which has impinged on the reflecting surface 3a is reflected toward the light source device 1 side, while part of the reflected light La from the medium 6 to be scanned impinges on a reflecting surface 3b adjacent to the reflecting surface 3a and is again reflected and passes through the single lenses 4 and 5. That light beam Lb concentrates in the vicinity of the point Pg on the medium 6 to be scanned. This light beam Lb becomes a ghost image and, if a photosensitive medium is installed on the medium 6 to be scanned, there will be formed an undesirable image.

In such a scanning optical system wherein the falling of the deflecting-reflecting surface is corrected, the linear image near the deflecting-reflecting surface 3a and the point on the surface of the medium 6 to be scanned are in a conjugate relation as shown in FIG. 4 and therefore, even if the incident light beam L is inclined relative to the rotational axis of the deflector as shown in FIG. 5, there is a problem that a ghost image is formed on the same scanning line.

SUMMARY OF THE INVENTION

It is an object of the present invention to eliminate the above-noted problem in a scanning optical system wherein correction of falling has been made and to provide a scanning optical system in which a ghost image is always caused to be formed at the same position outside the scanning line independently of the rotation of a deflector, whereby the ghost image is eliminated.

The scanning optical system according to the present invention is provided with a deflector for deflecting the light beam from a light source unit and scanning a medium to be scanned, and an imaging optical system disposed between the medium to be scanned and the deflector. A linear image near the deflecting-reflecting surface of the deflector and a point on the surface of the medium to be scanned are in a conjugate relation through the imaging optical system. The imaging optical system is such that the angle which the optical axis of the imaging optical system forms with respect to the optical axis of a light beam incident on the deflector in a plane parallel to the deflecting plane of the light beam is so selected that a ghost image is formed in the direction of the scanning line of the medium to be scanned and outside the effective scanning area.

The invention will become more fully apparent from the following detailed description thereof taken in conjunction with the accompanying drawings.

DESCRIPTION OF THE PREFERRED EMBODIMENT

Figure 1:
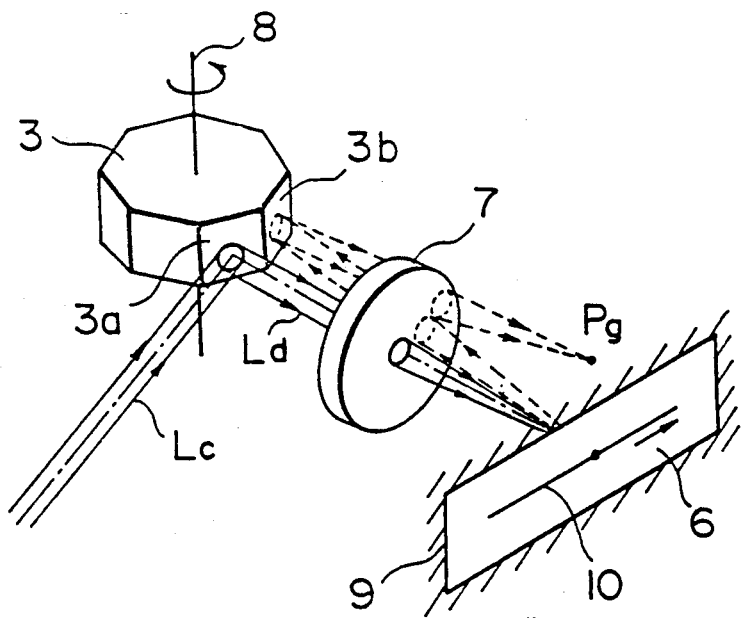
FIG. 1 shows a scanning optical system according to the prior art in which a ghost image is eliminated.
Figure 2:
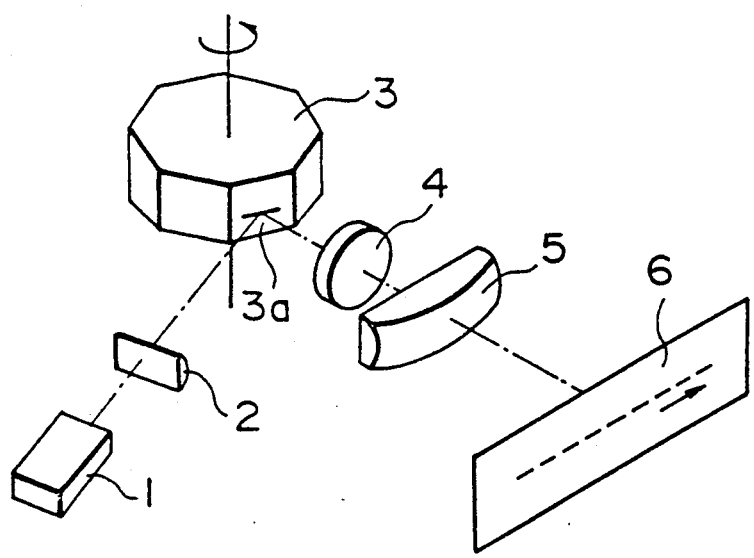
FIG. 2 shows an embodiment of the scanning optical system according to the prior art which has a falling correcting function.
Figure 3:
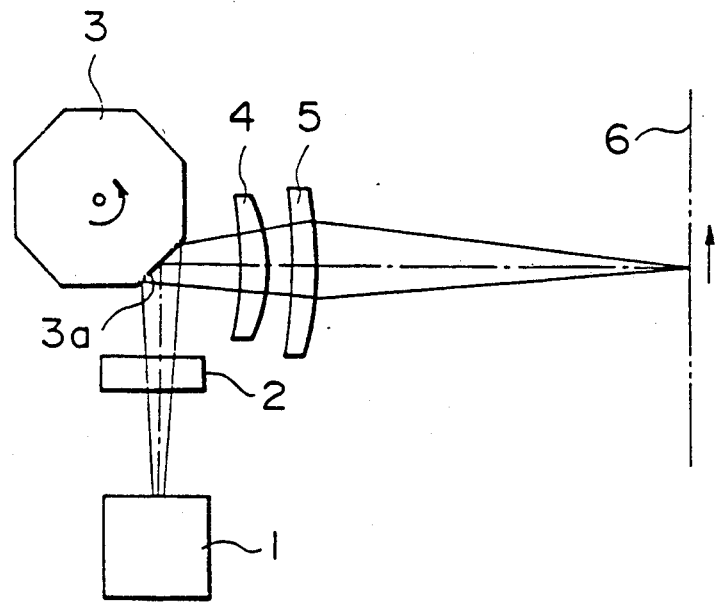
FIG. 3 shows an optical path in a plane parallel to the deflecting plane of the scanning optical system shown in FIG. 2.
Figure 4:
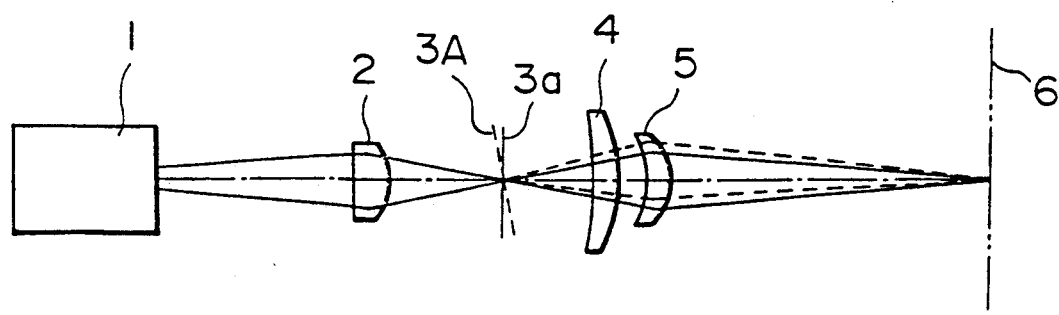
FIG. 4 shows an optical path in a plane perpendicular to the deflecting plane of the scanning optical system shown in FIG. 2.
Figure 5:
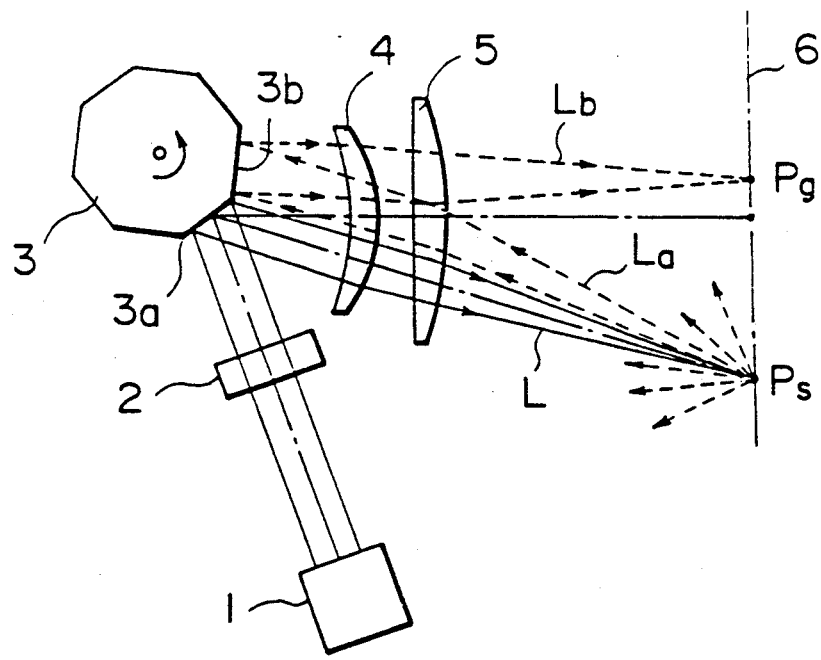
FIG. 5 illustrates the manner in which a ghost image is created in the scanning optical system shown in FIG. 2.
Figure 6:
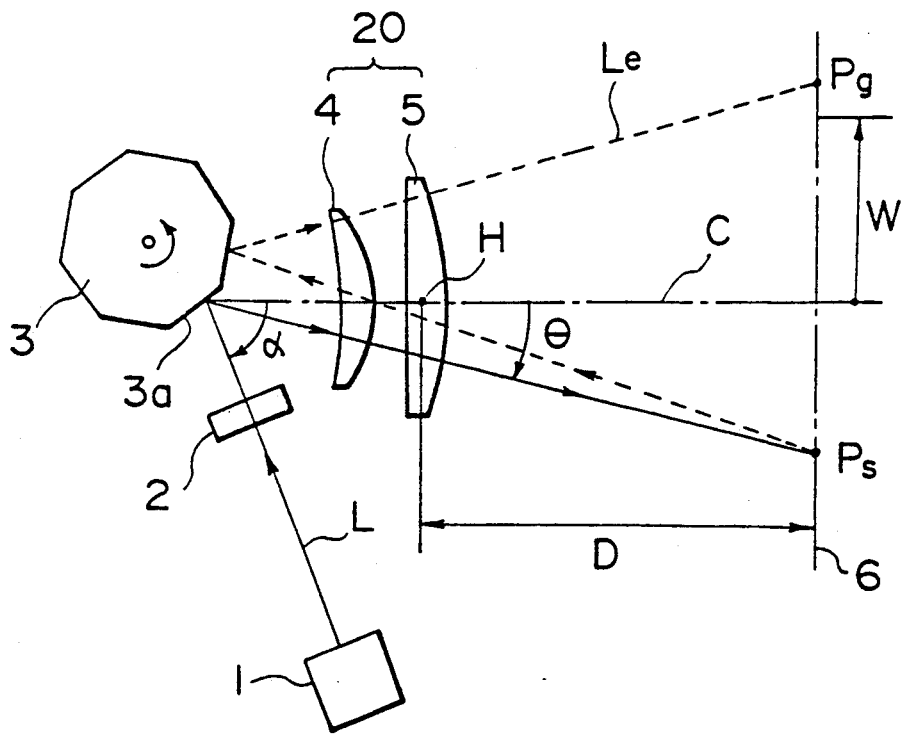
FIG. 6 illustrates the scanning optical system according to the present invention.

The invention will hereinafter be described in detail with respect to an embodiment thereof shown in FIG. 6. In FIG. 6, reference numerals identical to those in FIGS. 1 to 5 designate identical elements. In FIG. 6, a light beam L emitted from a light source device 1 impinges on a deflector 3 at an angle $\alpha$ with respect to the optical axis C of an imaging optical system 20 comprising single lenses 4 and 5. In the deflecting plane of the light beam L, the imaging optical system 20 has the f·θ characteristic that the distance from the optical axis C of the imaging optical system 20 to an imaged spot Ps is proportional to a deflection angle $\theta$ which the principal light ray reflected by the reflecting surface 3a of the deflector 3 forms with the optical axis C of the imaging optical system 20. In a plane parallel to the deflecting plane of the light beam L and containing the optical axis C of the imaging optical system 20, the direction of the light beam L from the light source device 1 is chosen so as to satisfy the following relation:

$$|\alpha| < (4\pi/N) - (W/D)$$

where D is the distance from the image side principal point H of the composite system of the imaging optical system 20 to the medium 6 to be scanned, N is the number of the reflecting surfaces of the deflector 3 and 2W is the effective scanning width on the medium 6 to be scanned. In this case, a ghost image Pg is formed outside the distance W from the optical axis C to the end of the effective scanning width and does not appear within the effective scanning width on the medium 6 to be scanned. Also, if a suitable light-intercepting plate is installed for intercepting the light beam Le of the ghost image Pg, the ghost image can be completely eliminated.

For example, where the deflector 3 is a rotatable polygon mirror having N reflecting surfaces, N being 8, the effective scanning width W is 100 mm, and the distance D from the image side principal point H of the imaging optical system 20 in the deflecting plane of the light beam Le to the medium 6 to be scanned is 300 mm, the relation that $\alpha < 1.2375$ radians or 70.90 degrees may be adopted.

Thus, the scanning optical system of the present invention in which a ghost image is eliminated imposes a predetermined limitation upon the angle which the optical axis of the light beam incident on the deflector forms with the optical axis of the imaging optical system to the medium to be scanned so that the ghost image always is stationary and outside the effective scanning width. Thus, the invention can prevent the ghost image from appearing as an undesirable image on the surface of the medium to be scanned.

What I claim is:

1. A scanning optical system for scanning a surface and for preventing formation of a ghost image on said surface within the effective scanning area that is scanned, said system comprising:

deflector means having a plurality of reflecting surfaces;

a light beam supplying optical system for forming a linear light beam image near one of said reflecting surfaces of said deflector means positioned to deflect a light beam toward the surface; and imaging means having different powers in orthogonal directions and rendering said one reflecting surface of said deflector means and the surface to be scanned in optically conjugate relation with each other in a plane perpendicular to the deflection plane formed by the light beam image as deflected by said deflector means;

wherein the angle $\alpha$ which the optical axis of said imaging means forms with the optical axis of said light beam supplying optical system satisfies:

$$|\alpha| < (4\pi/N) - (W/D)$$

where N is the number of reflecting surfaces of said deflector means, W is one half of the width of the effective scanning area, and D is the spacing between the principal point of said imaging means, which is adjacent to the surface to be scanned, and the surface to be scanned.

2. A scanning optical system according to claim 1, wherein said imaging means has f·θ characteristics.

3. A scanning optical system according to claim 1, further comprising light intercepting means for intercepting the light beam of the ghost image.

4. A laser beam recording apparatus comprising:

a laser light source;

a polygon mirror for deflecting the light beam from said laser light source, said mirror having a plurality of reflecting mirrors;

a first imaging optical system for imaging the light beam from said laser light source as a linear image near one of the reflecting surfaces of said polygon mirror, said linear image being one which extends in a direction perpendicular to the direction of the rotational axis of said polygon mirror; and a second imaging optical system disposed between said polygon mirror and a photosensitive medium and for imaging the light beam as deflected by said polygon mirror on the photosensitive medium, said second imaging optical system having different powers in orthogonal directions so that the linear image formed near said one of the reflecting surfaces of said polygon mirror is imaged on the photosensitive medium as a beam spot;

wherein the angle α which the optical axis of said first imaging optical system forms with the optical axis of said second imaging optical system satisfies:

$|\alpha| < (4\pi/N) - (W/D)$ where N is the number of reflecting surfaces of said polygon mirror, W is one half of the width of the effective scanning area on the photosensitive medium, and D is the spacing between the principal point of said second imaging optical system, which is adjacent to the photosensitive medium, and the photosensitive medium.

5. A laser beam recording apparatus according to claim 4, wherein said second imaging optical system has f·θ characteristics.

6. A laser beam recording apparatus according to claim 4, further comprising light intercepting means for intercepting the light beam of the ghost image.

* * * * *

UNITED STATES PATENT AND TRADEMARK OFFICE
CERTIFICATE OF CORRECTION

PATENT NO.   : 5,191,463
DATED        : March 2, 1993
INVENTOR(S)  : Kazuo Minoura It is certified that error appears in the above-identified patent and that said Letters Patent is hereby corrected as shown below:

On the cover page, change the title from "SCANNING OPTICAL SYSTEM IN WHICH A GHOST IMAGE IS ELMINATED" to --SCANNING OPTICAL SYSTEM IN WHICH A GHOST IMAGE IS ELIMINATED--.

Column 1, line 2, change "ELMINATED" to --ELIMINATED--.

Signed and Sealed this

Twenty-fifth Day of January, 1994

Attest:

BRUCE LEHMAN

*Attesting Officer*          *Commissioner of Patents and Trademarks*